(12) United States Patent
Kaufman

(10) Patent No.: US 7,854,278 B2
(45) Date of Patent: Dec. 21, 2010

(54) MOTOR VEHICLE ENERGY CONVERTER

(76) Inventor: Jay Stephen Kaufman, 24 Scotland Rd., Kingston, NH (US) 03848

( * ) Notice: Subject to any disclaimer, the term of this patent is extended or adjusted under 35 U.S.C. 154(b) by 0 days.

(21) Appl. No.: 12/218,329

(22) Filed: Jul. 14, 2008

(65) Prior Publication Data

US 2008/0271934 A1 Nov. 6, 2008

Related U.S. Application Data

(63) Continuation of application No. 11/124,594, filed on May 9, 2005, now Pat. No. 7,398,841.

(60) Provisional application No. 60/571,640, filed on May 17, 2004.

(51) Int. Cl.
*B60K 16/00* (2006.01)
(52) U.S. Cl. ........................... 180/2.2; 180/165
(58) Field of Classification Search ............... 180/165, 180/2.1, 2.2, 65.31, 302
See application file for complete search history.

(56) References Cited

U.S. PATENT DOCUMENTS

| | | | | |
|---|---|---|---|---|
| 3,666,038 A * | 5/1972 | Hudspeth et al. | ............ | 180/302 |
| 3,921,746 A * | 11/1975 | Lewus | ........................ | 180/165 |
| 4,093,035 A * | 6/1978 | Fletcher | ...................... | 180/2.2 |
| 4,134,469 A * | 1/1979 | Davis | ........................ | 180/2.2 |
| 4,141,425 A * | 2/1979 | Treat | .......................... | 180/2.2 |
| 4,163,367 A * | 8/1979 | Yeh | .............................. | 60/414 |
| 4,168,759 A * | 9/1979 | Hull et al. | .................... | 180/2.2 |
| 4,179,007 A * | 12/1979 | Howe | ........................ | 180/2.2 |
| 4,254,843 A * | 3/1981 | Han et al. | .................... | 180/165 |
| 4,290,268 A * | 9/1981 | Lowther | ....................... | 60/668 |
| 4,295,538 A * | 10/1981 | Lewus | ........................ | 180/165 |
| 4,354,565 A * | 10/1982 | Latter et al. | ................ | 180/69.5 |
| RE31,156 E * | 2/1983 | Dessert | ........................ | 180/2.2 |
| 5,091,679 A * | 2/1992 | Murty et al. | ................ | 318/153 |
| 5,280,827 A * | 1/1994 | Taylor et al. | ................ | 180/165 |
| 5,287,004 A * | 2/1994 | Finley | .......................... | 290/55 |
| 5,296,746 A * | 3/1994 | Burkhardt | .................... | 290/55 |
| 5,386,146 A * | 1/1995 | Hickey | ........................ | 290/55 |
| 5,460,239 A * | 10/1995 | Jensen | ........................ | 180/302 |
| 5,570,286 A * | 10/1996 | Margolis et al. | ............. | 701/36 |
| 5,680,764 A * | 10/1997 | Viteri | .......................... | 60/716 |
| 5,680,907 A * | 10/1997 | Weihe | ........................ | 180/2.2 |
| 5,725,062 A * | 3/1998 | Fronek | ........................ | 180/2.2 |
| 6,111,375 A * | 8/2000 | Zenobi | ........................ | 318/376 |
| 6,138,781 A * | 10/2000 | Hakala | ........................ | 180/2.2 |
| 6,311,797 B1 * | 11/2001 | Hubbard | ...................... | 180/165 |
| 6,758,295 B2 * | 7/2004 | Fleming | ...................... | 180/165 |
| 6,841,970 B2 * | 1/2005 | Zabramny | .................... | 320/101 |
| 6,966,394 B2 * | 11/2005 | Fleming | ...................... | 180/165 |
| 7,261,171 B2 * | 8/2007 | de la Torre et al. | ........ | 180/65.31 |
| 7,387,182 B2 * | 6/2008 | Fleming | ...................... | 180/165 |
| 7,398,841 B2 * | 7/2008 | Kaufman | ..................... | 180/2.2 |
| 7,416,039 B1 * | 8/2008 | Anderson et al. | ........... | 180/165 |
| 7,434,636 B2 * | 10/2008 | Sutherland | .................. | 180/2.2 |

(Continued)

*Primary Examiner*—Jeffrey J Restifo
(74) *Attorney, Agent, or Firm*—Michael J. Persson; Catherine E. Napjus; Lawson & Persson, P.C.

(57) ABSTRACT

An energy conversion apparatus using recovered energy sources including motor vehicle kinetic energy and wind resistance, supplemented by liquefied air transferred to the vehicle and by solar radiation thereto. The energy sources are combined, as available, to drive a compressor for supplying intake working fluid of a motor vehicle prime mover.

20 Claims, 3 Drawing Sheets

U.S. PATENT DOCUMENTS 7,445,064 B2 * 11/2008 Kim .......................... 180/2.2
2002/0153178 A1 * 10/2002 Limonius ................... 180/2.2
2007/0284155 A1 * 12/2007 Cong ........................ 180/2.2

* cited by examiner

MOTOR VEHICLE ENERGY CONVERTER

CROSS REFERENCE TO RELATED APPLICATIONS

This application is a continuation of U.S. patent application Ser. No. 11/124,594, filed on May 9, 2005 now U.S. Pat. No. 7,398,841, which claims the benefit of priority of Provisional Application Ser. No. 60/571,640, filed May 17, 2004.

BACKGROUND OF THE INVENTION

This invention presents an energy converter to recover and combine diverse motor vehicle energy sources for supplying compressed working fluid to a motor vehicle prime mover, wherein a liquefied air portion of the working fluid provides pre-compression cooling of an atmospheric air portion thereof; the liquefied air being made by recovered energy, stored and transferred between vehicles and between vehicles and stationary sites.

Increased fuel mileage and range in conjunction with low grade fuels has long been a goal of automotive design, to make driving more economical, to conserve fossil fuels, and to reduce emission of combustion products. Recovery and combining of vehicle energy sources as available, including kinetic (deceleration and shock), wind resistance, and solar radiation, is not described in the prior art. In addition, coordinated storage and transfer of recovered energy using pneumatic, cryogenic and electric systems is not described in the prior art. Recovery of only the deceleration component of kinetic energy, coordinated with electrical transfer between batteries and generators, is used in lightweight hybrid vehicles to provide limited performance improvement. Relevant vehicle energy recovery and consumption devices described in the prior art have disadvantages, as follows:

(a) U.S. Pat. No. 1,671,033 to Kimura (1928) describes a transmission with an electric generator and battery storage for recovery of vehicle deceleration, the component of vehicle kinetic energy in the direction of travel. The recovered energy, normally dissipated by engine compression and vehicle braking, is stored in batteries and used for limited electrical power assist. Deceleration energy is not completely recoverable due in part to insufficient battery capacity.

(b) U.S. Pat. No. 3,688,859 to Hudspeth and Lunsford (1972) describes compressors connected between the frame and axles of a vehicle for recovery of shock, the upward component of vehicle kinetic energy. The recovered energy, normally dissipated by shock absorbers, is used for limited pneumatic power assist. Shock energy is not completely recoverable due to compression heating.

(c) U.S. Pat. No. 6,138,781 to Hakala (2000) describes an electric generator for recovery of vehicle wind energy. The recovered energy, normally dissipated by vehicle drag force, is used for limited electrical power assist. Potential wind energy recovery is not realized because air from a wind recovery device is discharged to relatively high wake pressure. In addition, aerodynamic vehicle shapes are often used to reduce drag loss at the expense of vehicle function, such as carrying capacity.

(d) U.S. Pat. No. 5,725,062 to Fronek (1998) describes the use of a solar photo-voltaic panel atop a vehicle for recovery of solar energy radiating to a vehicle. The recovered energy, normally dissipated to the atmosphere, is used for limited electrical power assist. Solar radiation to a vehicle is not completely recoverable due in part to insufficient battery capacity.

(e) U.S. Pat. No. 4,182,960 to Reuyl (1980) describes transfer of electrical energy between vehicles and stationary sites. Solar energy recovered at a site is stored in batteries to provide power to the site and a portion is transferred to, and stored in batteries in a hybrid gas turbine-electric vehicle. The gas turbine can provide power to the site via an electric generator to supplement site solar energy. Battery storage problems include space and weight limitation, trade-off between battery life and energy discharged, replacement handling, charge time, and ventilation.

Research programs at the University of Washington ("Ultra-Low Emission Liquid Nitrogen Automobile" Knowlen, Mattick, Hertzberg, and Bruckner, SAE-1999-0102932, 1999) and the University of North Texas ("Cryogenic Heat Engines for Powering Zero Emission Vehicles", Ordonez, Plummer, and Reidy, IMEECE2001/PID-25620, 2001) describe a liquefied gas system to supply liquid nitrogen for on-board storage and use in zero emissions vehicles powered by ambient temperature heat engines. Transfer of liquefied gas between vehicles and from vehicles to stationary sites, for use thereof, is not described in the prior art. Liquefied gas transfer problems include boil-off and fill and drain connection.

(f) The prior art describes several types of gas liquefiers including; vapor-compression, magnetic, Stirling cycle and thermo-acoustic, for stationary application. State-of-the-art air liquefiers require compression work of approximately 2.5 times the heat removed per 2.2 kg (1 lb) of air liquefied.

(g) Gas turbine engine powered vehicles are described in the prior art and were produced by Rover and by Chrysler Corporation during the 1950's and 1960's. Gas turbine engines require high turbine inlet temperature to provide acceptable thermal efficiency. Other problems include high compression work, high turbine blade and exhaust gas temperature, and expensive heat exchangers. Operation is characterized by falling efficiency with load and compression braking is unavailable. Low grade fuels such as kerosene can be burned, however emissions are high due to high fuel consumption and formation of compounds at high temperature.

(h) U.S. Pat. No. 4,294,323 to Boese (1981) describes a gas expander using cryogenic liquid working fluid. Cryogenic expanders have low specific expansion energy due to heat input at ambient temperature. Research programs at the University of Washington ("Ultra-Low Emission Liquid Nitrogen Automobile" Knowlen, Mattick, Hertzberg, and Bruckner, SAE-1999-0102932, 1999) and at the University of North Texas ("Cryogenic Heat Engines for Powering Zero Emission Vehicles", Ordonez, Plummer, and Reidy, IMEECE2001/PID-25620, 2001) describe development of liquid nitrogen expanders with emphasis on maximizing output by designing for quasi-isothermal expansion. Expanders have limited usefulness in lightweight, short range, low speed vehicles for zero emission urban use.

(i) U.S. Pat. No. 3,525,874 to Toy (1970) describes a hybrid gas turbine-electric prime mover, and U.S. Pat. No. 3,566,717 to Berman (1971) describes a hybrid transmission for parallel operation of a combustion engine and an electric motor. Recovered deceleration energy, normally dissipated by engine compression and vehicle braking, is stored in batteries and used for power assist in hybrid vehicles. Combustion engine efficiency is low, and deceleration is not completely recoverable due in part to insufficient battery capacity.

SUMMARY OF THE INVENTION

It is an object of the present invention, therefore, to provide systems for recovery of energy dissipated by a motor vehicle, as well as solar radiation.

It is another object of the present invention to provide systems for storage and transfer of recovered energy.

It is still another object of the present invention to provide systems for efficient consumption of recovered energy.

It is yet another object of the present invention to provide a prime mover capable of burning renewable fuel with improved emissions.

In keeping with these objects and others, which may become apparent the present invention seeks to provide a unified energy system to recover, store, transfer and consume energy dissipated by motor vehicles, or otherwise available thereto. In essence, combining recoverable energy sources as available yields greater benefit than when taken individually. For example, full potential of a gas turbine is realized using recovered energy to provide the compressed air requirement.

Combined recovery of vehicle energy sources including kinetic (deceleration and shock), wind resistance, and solar radiation to compress atmospheric air provides substantial vehicle power assist. Recovery is by compression of atmospheric air for consumption as working fluid in vehicle prime movers. Liquefied air is imported to the vehicle as a form of energy storage by providing pre-compression cooling of prime mover working fluid. In addition, a liquefier makes supplementary liquefied air using excess recovered energy, such as during high speed driving when vehicle wind resistance, a function of the third power of speed, predominates. Excess liquefied air is transferred from the vehicle for use in other vehicles or at stationary sites. The recoverable portion of energy dissipated by a vehicle, estimated in accordance with standard highway driving cycle US-06, is: deceleration, 25%; wind resistance, 10%; shock, 10%. In addition 91 kg (200 lb) of imported liquefied air effectively increases the recovered total by 25% and clear day solar radiation adds another 8%. Energy recovery by diverse means enhances performance over a wide range of driving conditions, providing a three-fold increase in prime mover efficiency, because prime mover compression by recovered energy is a virtual energy loss. Accordingly, advantages of the present invention are illustrated as follows:

(a) A feature of the energy system in accordance with the present invention lies in providing an energy recovery transmission for recovery of vehicle deceleration energy by compression of atmospheric air.

(b) Another feature of the energy system in accordance with the present invention lies in providing energy recovery shock absorbers with cryogenic cooling for efficient compression of atmospheric air.

(c) Another feature of the energy system in accordance with the present invention lies in providing an energy recovery turbine to drive an atmospheric air compressor. The turbine operates on the difference between wind impact pressure and wake pressure at high suction locations behind an air dam, the windshield/roof intersection, and other leading edges. Vehicle shapes are designed for the best use of recovered wind energy as it effects vehicle cost, carrying capacity and style.

(d) Another feature of the energy system in accordance with the present invention lies in providing an energy recovery solar-electric panel to drive an atmospheric air compressor. Energy is recovered during parking, stopping and driving of a vehicle.

(e) Another feature of the energy system in accordance with the present invention lies in providing air compression and liquefied air storage of recovered energy, plus capability to transfer liquefied air between vehicles or between vehicles and stationary sites. In addition air compression provides vehicle braking assist.

(f) Another feature of the energy system in accordance with the present invention lies in providing an on-board vehicle air liquefier to liquefy suitably pure atmospheric air. Required liquefier compression is equivalent to that of state-of-the-art liquefiers, however work input using recovered vehicle energy is a virtual energy loss.

(g) Another feature of the energy system in accordance with the present invention lies in providing an efficient gas turbine prime mover. Compression, using recovered vehicle energy above approximately 25% turbine load, is a virtual energy loss. Pre-compression cooling of working fluid with liquefied air enables reduced turbine inlet and exhaust temperatures. Heat input is from a renewable fuel, such as methanol. Efficiency is relatively constant over the load range and low fuel consumption lowers emissions while expanding fuel choices.

(h) Another feature of the energy system in accordance with the present invention lies in providing a quasi-isothermal liquefied air expander for urban driving. Compression work, using recovered vehicle energy, is a virtual energy loss.

(i) Still another feature of the energy system in accordance with the present invention lies in providing a gas turbine/air expander with virtual compression to power a hybrid vehicle. The gas turbine operates independently and efficiently over a wide load range. The expander and gas turbine operate in parallel with the added benefit of turbine exhaust heat recovery into the working fluid of the expander. The expander operates independently during urban driving when the gas turbine is least efficient.

Other general and more specific objects and advantages of the present invention will in part be obvious and will in part appear from the drawings and description which follows.

BRIEF DESCRIPTION OF THE DRAWINGS

Objects and advantages of the present invention will become apparent from the following when read in conjunction with the accompanying drawings and reference numerals list, wherein solid lines connecting components indicate fluid flow, arrows indicate flow direction, and dashed lines indicate electrical connection.

REFERENCE NUMERALS

Figure 1:
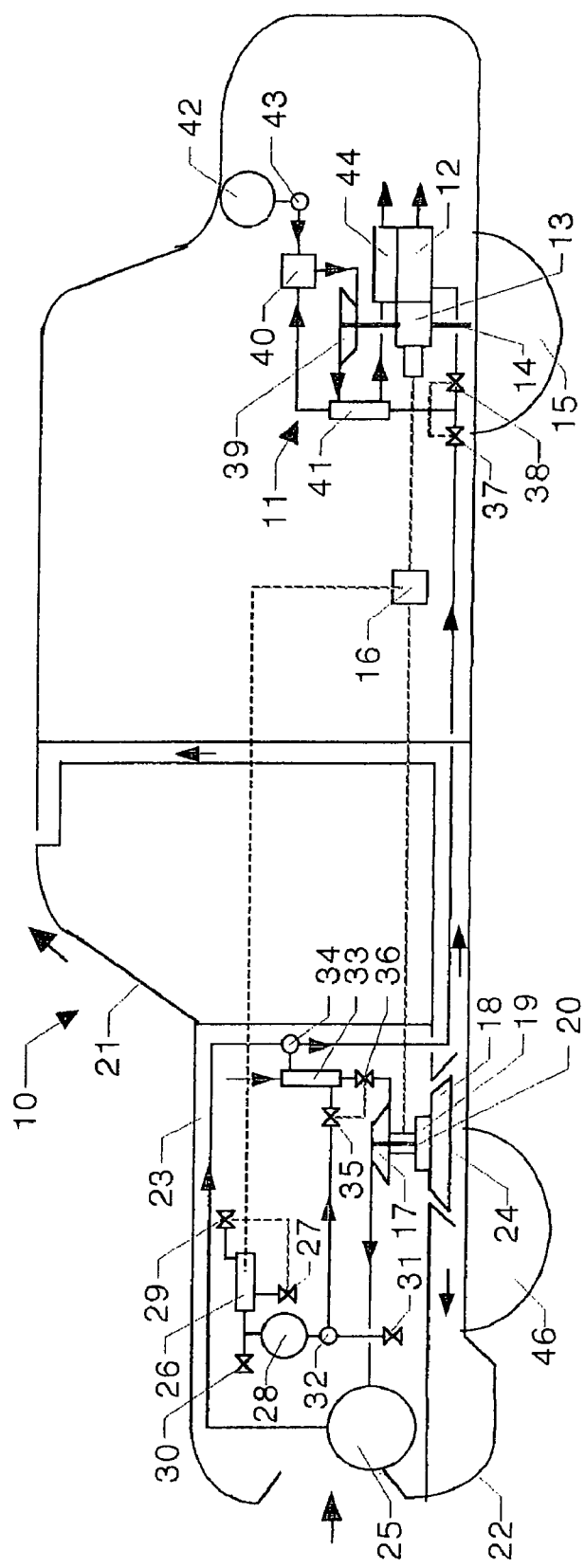
FIG. 1 is a schematic illustration showing connection of components of an energy recovery, storage, transfer and consumption system in a motor vehicle.
Figure 2:
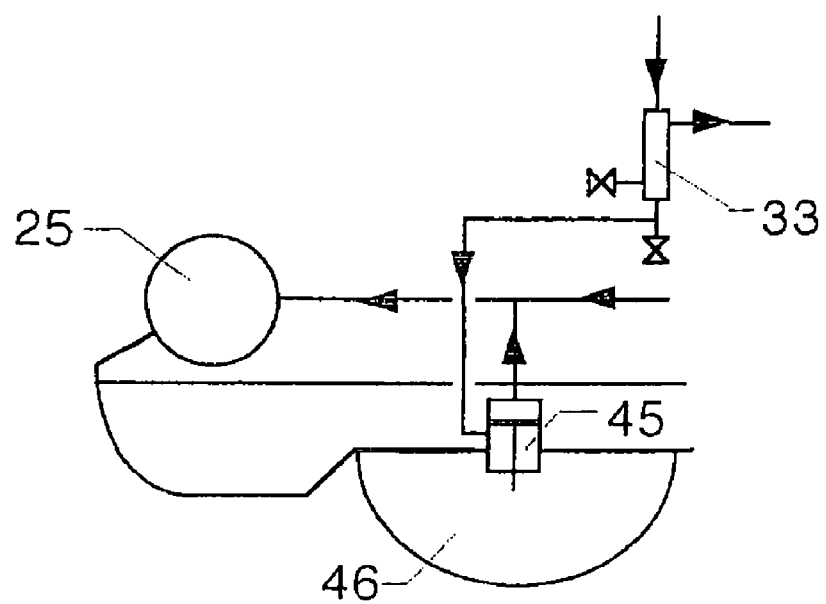
FIG. 2 is a schematic illustration of one of four shock compressors connected in the motor vehicle of FIG. 1.
Figure 3:
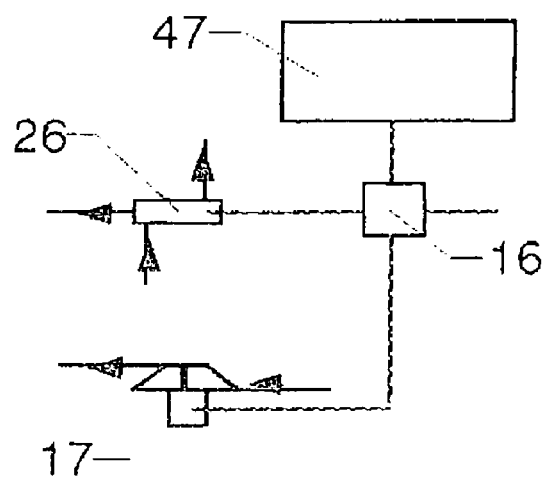
FIG. 3 is a schematic illustration of a solar electric panel connected to drive an air compressor in the motor vehicle of FIG. 1.

FIG. 1:
10 vehicle (typical)
11 gas turbine engine
12 air expander
13 transmission-generator drive
14 shaft 15 rear wheel-axle assembly
16 motor controller
17 motor-compressor
18 axial wind drive
19 clutch
20 motor-compressor shaft
21 windshield
22 air dam
23 compartment
24 air duct
25 compressed air tank
26 air liquefier
27 liquefier intake valve
28 liquid air tank
29 vent valve
30 liquid air fill valve
31 liquid air drain valve
32 liquid air pump
33 evaporator
34 header
35 pumped air valve
36 compressed air valve
37 throttle
38 expander valve
39 gas turbine
40 combustor
41 recuperator
42 fuel tank
43 fuel pump
44 heating jacket
FIG. 2:
45 shock compressor drive
46 front wheel-axle assembly
FIG. 3:
47 solar photo-voltaic panel

DESCRIPTION OF PREFERRED EMBODIMENTS

FIG. 1 illustrates a preferred embodiment of the energy recovery, storage, transfer and consumption system of the present invention installed in a motor vehicle 10. An engine 11 combined with an air expander 12 by a transmission-generator drive 13 provides prime mover propulsion to the vehicle via a shaft 14 and a rear wheel-axle assembly 15. Deceleration energy is recovered by drive 13, which is electrically connected to a motor controller 16 to power a motor-compressor 17. Wind energy is recovered by an axial wind drive 18 connected to motor-compressor 17 through a clutch 19, which provides torque to a motor-compressor shaft 20 when wind energy is sufficient. Drive 18 operates on the difference between impact pressure and wake suction pressure behind a windshield 21 and an air dam 22. Impact air pressurizes a compartment 23 and discharges through an air duct 24. Motor-compressor 17 compresses air into a compressed air tank 25. An air liquefier 26 draws atmospheric air through a liquefier intake valve 27 and discharges liquefied air to a liquefied air tank 28 while venting through a vent valve 29. Liquefied air is transferred to the vehicle into tank 28 through a liquefied air fill valve 30 and transferred from the vehicle through a liquefied air drain valve 31.

Liquefied air is pressurized by a liquefied air pump 32 and vaporizes while cooling atmospheric air in an evaporator 33. The cooled air is pressurized by motor-compressor 17, mixed with the vaporized air in a header 34, and the mixture delivered to the engine and the expander under control of a pumped air valve 35 and a compressed air valve 36. The ratio of expander air to combustion air is controlled by a throttle 37 and an expander valve 38.

Engine 11 is a gas turbine 39 connected to a combustor 40 and a recuperator 41. Fuel is stored in a fuel tank 42 and pressurized by a fuel pump 43. Combustion products from the recuperator pass through a heating jacket 44 of the expander to atmosphere.

Evaluation of vehicle highway performance is based on US-06 (Supplemental Federal Test Procedure) for 6 hours at average speed of 77 km/hr (48 mph). US-06 is the most aggressive real highway driving cycle and illustrates the combination of deceleration drive 13 and wind drive 18. Methanol fuel is selected because it is renewable, air requirements are low due to oxygen content, and large scale production is enabled by use in high efficiency engines. With an initial fill of 91 kg (200 lb) of liquefied air, "gasoline equivalent mileage" is 25 km/l (150 mpg) and liquefied air consumption is 113 kg (250 lb), for a distance 463 km (288 ml).

Evaluation of vehicle urban performance is based on LA-92 (California Air Resources Board) for 4 hours at average speed of 40 km/hr (25 mph). LA-92 is the most aggressive real urban driving cycle and illustrates operation when vehicle speed is too low for effective recovery of wind energy. Efficient operation is with engine 11 off, expander 12 operating on air from tank 25, and wind drive 18 disengaged by clutch 19. With an initial fill of 91 kg (200 lb) of liquefied air, "liquefied air equivalent mileage" is 1.9 km/kg (0.53 ml/lb) for a distance 161 km (100 ml).

Drive 13 recovers deceleration energy while prime mover air consumption drops, providing electrical power to motor-compressor 17 and liquefier 26 based on pressure in tank 25. Drive 18 recovers wind energy during forward motion of the vehicle above approximately 56 km/hr (35 mph) due to difference of 2.5 velocity heads between vehicle impact pressure and wake suction pressure behind windshield 21 and air dam 22. Excess wind energy for liquefied air production is recovered at an increasing rate, proportional to the third power of vehicle speed. Estimated deceleration recovery is 75% of vehicle acceleration and estimated wind recovery is 25% of vehicle wind resistance.

Quasi-isentropic motor-compressor 17 normally maintains expander and engine air pressure in tank 25 at 300 K (540 R), 4 mPa (40 atm) with valve 27 and 30 closed and valves 35 and 36 open. Estimated efficiency of the motor-compressor is 80%.

Air liquefier 26 operates on over-pressure in tank 25 to deliver 23 kg (50 lb) of liquefied air to tank 28 during 6 hours of US-06 driving with valve 29 open and valves 27 and 30 closed. Estimated liquefaction energy is 1395 kj/kg (600 btu/lb) of liquefied air produced; approximately twice the ideal and one-half the energy input of commercial liquefiers.

Combined engine 11 and expander 12 deliver up to 71 kW (95 hp) to meet US-06 vehicle acceleration. Engine output is 15100 kJ/kg (6500 btu/lb) of fuel with an air-fuel ratio of 15, and turbine inlet temperature is 1500 K (2700 R) at 4.0 mPa (40 atm). Methanol consumption is 1.5 kg/hr (3.3 lb/hr) with total liquefied air of 19 kg/hr (42 lb/hr). Engine exhaust gas, including latent heat of condensable products, maintains jacket 45 inlet air temperature of 444 K (800 R) at 4.0 mPa (40 atm), and exhaust temperature of 300 K (540 R). Expander output is 1400 kJ/kg (600 btu/lb) of liquefied air, and drops by 50% with the engine off and no exhaust heating. Estimated engine and expander efficiencies are 85%.

FIG. 2 illustrates an embodiment of the present invention for recovery of vehicle shock energy. A four shock compressor drive 45 (typical), connected to each end of rear wheel-axle assembly 15 and to each end of a front wheel-axle assembly 46, provides compressed air from evaporator 33 into tank 25.

Drive 45 recovers an additional 9% of US-06 driving resistance, increasing fuel mileage of the FIG. 1 configuration by 12% and liquefier output by 58%. Air from evaporator 33 at 94 K (170 R) is compressed into tank 25 at 300 K (540 R), 4 mPa (40 atm) by action of the shock compressor drive due to reciprocating wheel-axle motion. Recovered shock energy is estimated at 30% of rolling resistance, a function of road surface roughness, vehicle speed, and tire pressure, as well as bearing friction.

FIG. 3 illustrates an embodiment of the present invention for recovery of solar radiation by a solar photo-voltaic panel 47 atop the vehicle. Electrical output from the panel to controller 16 powers motor-compressor 17 and liquefier 26.

Panel 47 recovers an equivalent 8% of US-06 driving resistance, increasing fuel mileage of the FIG. 1 configuration by 8% and liquefier output by 48%. Because energy recovery also occurs during vehicle inactivity, liquefier output accumulates. Recovered energy is based on a representative 4.6 m2 (50 ft2), 20% efficient panel in sun. Atmospheric air is compressed into tank 25 at 300 K (540 R), 4 mPa (40 atm).

Although the description above contains many specifics, these should not be construed as limiting the scope of the invention, but only to provide illustrations of some of the preferred embodiments of this invention. For example;

The energy recovery, storage, transfer and consumption system of the present invention can be used in trucks and other vehicle types using any suitable fuel or working fluid.

Deceleration, wind, shock and solar energy can be recovered in combination to provide mechanical or electrical drive of prime mover working fluid compressors or other vehicle components.

Electric batteries can be used to supplement energy storage.

Vapor-compression, two phase expansion, magnetic, thermo-acoustic, thermoelectric and Stirling liquefiers can be used, and emissions features such as air separation for constituent liquefaction can be added. A liquefier expansion-engine can be used for power assist of vehicle components.

Diesel or other engine types can be used separately or in combination with a gas expander as series or parallel hybrid prime movers. A gas turbine engine can have performance features such as working fluid reheat; and emissions features such as separation of carbon dioxide from combustion products, support of combustion by oxygen enriched air, and combustion cooling by water, nitrogen or other fluid. A gas expander can have performance features such as injection of heat transfer fluid to increase temperature and improve expansion isothermicity of the working fluid.

Thus the scope of the invention should be determined by the appended claims and their legal equivalents, rather than the examples given.

What is claimed is:

1. An energy converter for recovering waste energy and converting said waste energy into recovered energy for use by a motor vehicle, said energy converter comprising:
    energy input means for recovering energy dissipated by said motor vehicle, said energy input means comprising kinetic drive means for producing recovered kinetic energy from the motor vehicle and wind drive means for producing recovered wind energy from the motor vehicle, wherein said kinetic drive means comprises:
        shock absorption energy recovery means for producing recovered kinetic energy from shock forces upon the motor vehicle; and
        vehicle deceleration energy recovery means for producing recovered kinetic energy from deceleration forces upon the motor vehicle;
    means for controllably combining energy recovered by said kinetic drive means and said wind drive means to produce combined recovered energy, and
    energy output means for producing a working fluid for driving at least one powered component of the motor vehicle, wherein said energy output means is powered by said combined recovered energy.

2. The energy converter as claimed in claim 1 wherein said energy output means comprises at least one motor-compressor in fluid communication with an air intake and an engine of the motor vehicle.

3. The energy converter as claimed in claim 1 wherein said energy output means comprises air liquefaction means for converting atmospheric air to liquefied air.

4. The energy converter as claimed in claim 2 wherein said energy output means further comprises air liquefaction means for converting atmospheric air to liquefied air.

5. The energy converter as claimed in claim 1 wherein said wind drive means comprises an axial wind drive and wherein said axial wind drive operates based upon a difference between an impact pressure and a wake suction pressure about at least one leading edge of said motor vehicle.

6. The energy converter as claimed in claim 1 wherein said kinetic drive means comprises shock absorption energy recovery means for producing recovered kinetic energy from shock forces upon the motor vehicle.

7. The energy converter as claimed in claim 1 wherein said shock absorption energy comprises a shock compressor drive that recovers kinetic energy by compressing air.

8. The energy converter as claimed in claim 1 wherein said kinetic drive means comprises vehicle deceleration energy recovery means for producing recovered kinetic energy from deceleration forces upon the motor vehicle.

9. The energy converter as claimed in claim 1 wherein said vehicle deceleration energy recovery means converts deceleration energy into electricity and wherein said means for controllably combining energy recovered by said kinetic drive means and said wind drive means comprises an electrical storage battery in electrical communication with said deceleration energy recovery means.

10. The energy converter as claimed in claim 1 wherein said energy input means further comprise solar energy recovery means for recovering solar energy incident upon said vehicle, wherein said solar energy recovery means converts solar energy into electricity and wherein said means for controllably combining energy recovered by said kinetic drive means and said wind drive means comprises an electrical storage battery in electrical communication with said solar energy recovery means.

11. A motor vehicle comprising:
    at least one powered component; and
    an energy converter for recovering waste energy and converting said waste energy into recovered energy for use by at least one of said at least one powered component of said motor vehicle, said energy converter comprising:
        energy input means for recovering energy dissipated by said motor vehicle, said energy input means comprising kinetic drive means for producing recovered kinetic energy from the motor vehicle and wind drive means for producing recovered wind energy from the motor vehicle, wherein said kinetic drive means comprises:
            shock absorption energy recovery means for producing recovered kinetic energy from shock forces upon the motor vehicle; and vehicle deceleration energy recovery means for producing recovered kinetic energy from deceleration forces upon the motor vehicle;

means for controllably combining energy recovered by said kinetic drive means and said wind drive means to produce combined recovered energy, and energy output means for producing a working fluid for driving at least one component of the motor vehicle, wherein said energy output means is powered by said combined recovered energy.

12. The motor vehicle as claimed in claim 11 wherein said motor vehicle further comprises at least one leading edge and wherein said wind drive means operates based upon a difference between an impact pressure and a wake suction pressure about said at least one leading edge of said motor vehicle.

13. The motor vehicle as claimed in claim 11 wherein said kinetic drive means of said energy converter comprises shock absorption energy recovery means for producing recovered kinetic energy from shock forces upon said motor vehicle.

14. The motor vehicle as claimed in claim 11 wherein said shock absorption energy recovery means of said energy converter comprises a shock compressor drive that recovers kinetic energy by compressing air.

15. The motor vehicle as claimed in claim 11 wherein said kinetic drive means of said energy converter comprises vehicle deceleration energy recovery means for producing recovered kinetic energy from deceleration forces upon said motor vehicle.

16. The motor vehicle as claimed in claim 11 wherein said vehicle deceleration energy recovery means of said energy converter converts deceleration energy into electricity and wherein said means for controllably combining energy recovered by said kinetic drive means and said wind drive means comprises an electrical storage battery in electrical communication with said vehicle deceleration energy recovery means.

17. The motor vehicle as claimed in claim 11 wherein said energy input means of said energy converter further comprises solar energy recovery means for recovering solar energy incident upon said vehicle, wherein said solar energy recovery means converts solar energy into electricity and wherein said means for controllably combining energy recovered by said kinetic drive means and said wind drive means comprises an electrical storage battery in electrical communication with said solar energy recovery means.

18. The motor vehicle as claimed in claim 11, wherein said energy output means comprises at least one motor-compressor in fluid communication with an air intake, and wherein said motor vehicle further comprises cryogenic cooling means, wherein said cryogenic cooling means comprises:

cryogenic liquid transfer and storage means for transferring and storing a cryogenic liquid imported to said vehicle, and heat exchange means for cooling atmospheric air flowing into said air intake of said motor-compressor with said cryogenic liquid, wherein said heat exchange means is in fluid communication with said cryogenic liquid transfer and storage means and said air intake of said motor-compressor and is shaped and dimensioned such that a sufficient amount of heat is transferred from said atmospheric air to said cryogenic liquid to cause at least a portion of said cryogenic liquid to vaporize.

19. The motor vehicle as claimed in claim 11 wherein said energy output means of said energy converter comprises at least one motor-compressor in fluid communication with an air intake and an engine of the motor vehicle.

20. The motor vehicle as claimed in claim 11 wherein said energy output means of said energy converter comprises air liquefaction means for converting atmospheric air to liquefied air.

* * * * *